Nov. 4, 1941.                W. L. BRINTNELL                2,261,751
                          LANDING GEAR FOR AIRCRAFT
                    Filed May 23, 1940          2 Sheets-Sheet 1
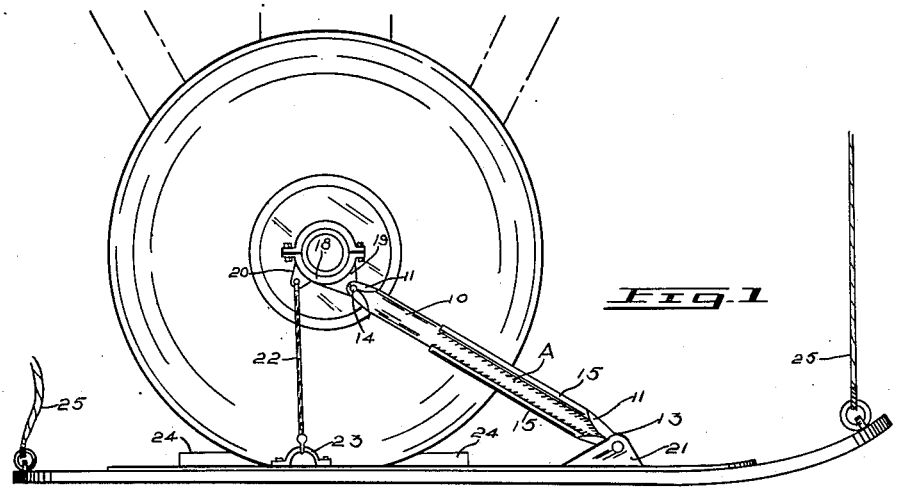
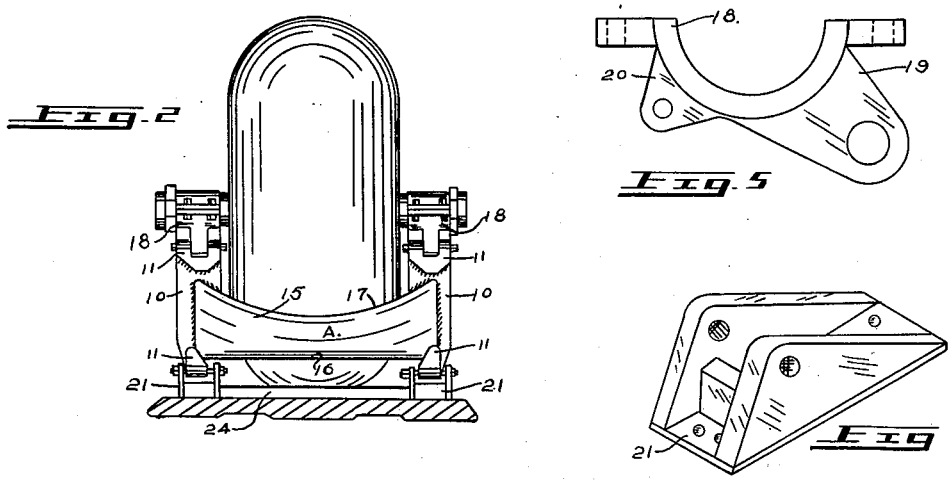
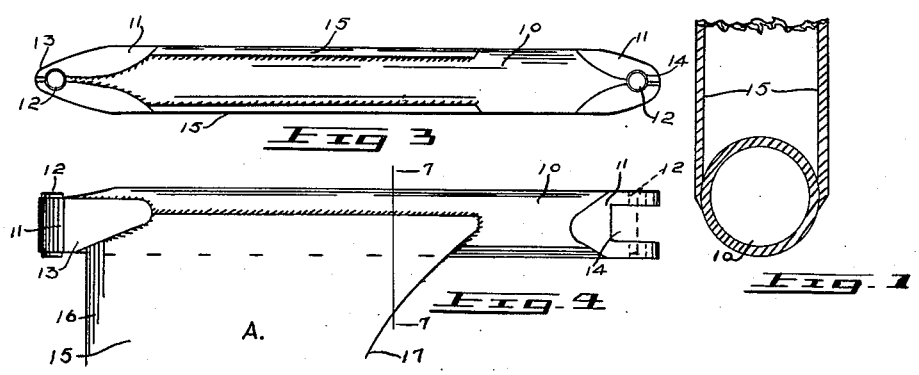
INVENTOR
Wilfred L. Brintnell
By Ralph Burch
Attorney Nov. 4, 1941.	W. L. BRINTNELL	2,261,751
LANDING GEAR FOR AIRCRAFT
Filed May 23, 1940	2 Sheets-Sheet 2
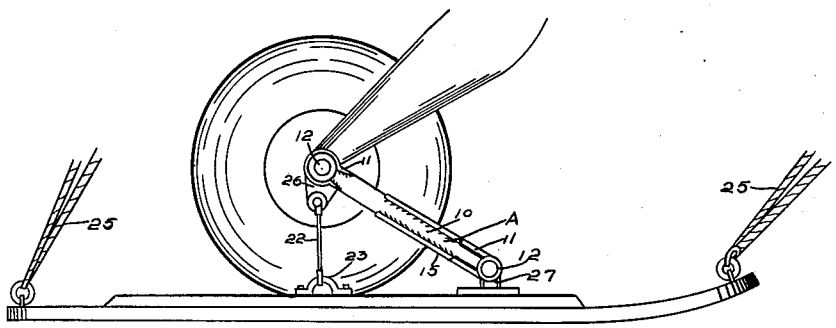
Fig 8
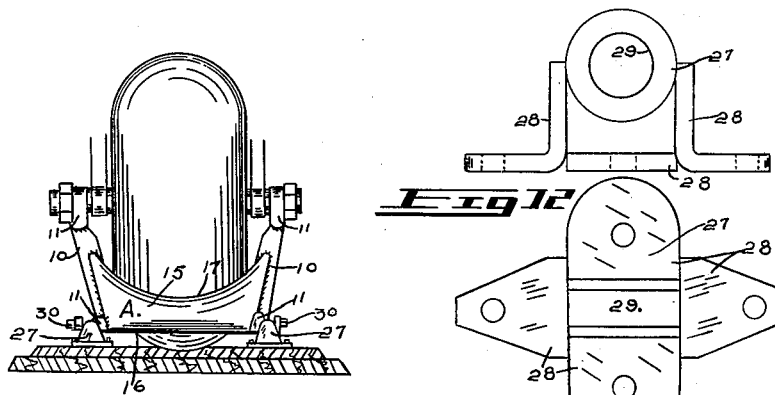
Fig 9
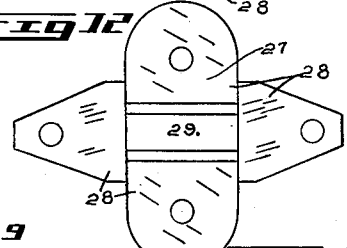
Fig 12
Fig 13
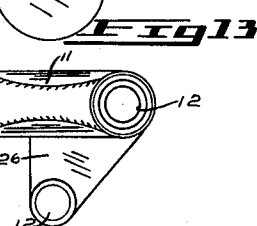
Fig 10
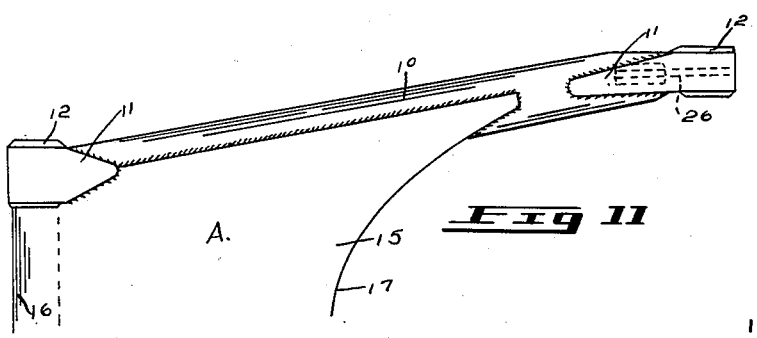
Fig 11
INVENTOR
Wilfred L. Brintnell
By Ralph Burch
Attorney Patented Nov. 4, 1941

2,261,751

UNITED STATES PATENT OFFICE 2,261,751

LANDING GEAR FOR AIRCRAFT

Wilfred Leigh Brintnell, Edmonton, Alberta, Canada, assignor to Aircraft Repair Limited, Edmonton, Alberta, Canada Application May 23, 1940, Serial No. 336,854

4 Claims. (Cl. 244—108)

This invention relates to landing gear for aircraft and more particularly to a ski apparatus which may be used without removing the wheels from the undercarriage.

An important object of this invention is to construct a ski unit that may be easily and quickly attached to the normal undercarriage without necessitating the removal of the wheels.

A further important object is to overcome the heretofore objectionable characteristics of this type of ski; that is, although the principle applied has usually been correct, the involved nature of the structure has inevitably produced structural weaknesses, excess weight and similar handicaps.

A further object is to retain the shock absorbing qualities of the undercarriage and pneumatic tires in aircraft.

Further objects are ease in the replacement of parts, low manufacturing cost and a maximum of streamlining combined with a maximum of strength.

With these and other objects in view which may appear as the description proceeds the invention consists of the novel construction and arrangement of co-operating parts as hereinafter more specifically set forth, claimed and shown in the accompanying drawings forming part of this application, and in which:

Fig. 1 is a side elevation view of the device attached to the landing wheel.

Fig. 2 is a front elevation view of the device attached to the landing wheel.

Fig. 3 is a side elevation view of the yoke.

Fig. 4 is a fragmentary plan view of the yoke.

Fig. 5 is an enlarged side elevation view of the axle lug.

Fig. 6 is a perspective view of the ski bracket.

Fig. 7 is a sectional view along the line 7—7 of Fig. 4.

Fig. 8 is a side elevation view of a modified form of device adapted to assembly on the tail wheel.

Fig. 9 is a front elevation view of the tail wheel assembly.

Fig. 10 is a side elevation view of the yoke seen in Fig. 8.

Fig. 11 is a fragmentary plan view of the yoke.

Fig. 12 is an elevation view of the ski fitting.

Fig. 13 is a plan view of the ski fitting.

It will be noted that certain differences exist between the tail ski assembly and the landing ski assembly, therefore, to clarify the description the device as shown in Figs. 1 to 7, inclusive, will be first described in detail, in which similar reference characters will designate corresponding parts throughout the several views.

The primary element of the assembly is a yoke A, consisting of two tubular members 10, the extremities thereof being strengthened by wrap plates 11, welded thereto. Each extremity of the said tubular members is axially mounted, one extremity to the wheel axle and the opposite extremity to a ski fitting as will be explained in detail as the description proceeds. Hardened tubular fittings 12 are provided at each extremity for this purpose.

As best shown in Fig. 4, one extremity of the tube 10 consists of a single tubular housing 13, the opposite extremity is bifurcated 14. Reverting to Fig. 1, it may be seen the extremity 14 is connected to the wheel axle, the extremity 13 to the ski fitting.

A guard plate 15 is welded to the upper and lower surfaces of the tubes 10, the said guard plate being a hollow, inclosed member, rounded at the front 16, and square at the opposite side 17, adjacent the wheel. It will be seen the side 17, is curved in a concave manner to lie more closely about the said wheel. The said plate is primarily provided to strengthen the device.

Two axle lugs 18 are provided, to be secured on either side of the wheel. Two flanges extend therefrom, a major flange 19 and a minor flange 20. The major flanges 19 receive the bifurcated ends 14 of the tubes 10, and are secured by bolts, thereby providing an axial connection at the wheel.

Two brackets 21 are provided, to be secured by bolts to the ski. The said brackets each comprise a base, and two triangular side members and a brace therebetween. The brackets 21 receive the ends 13, of the tubes 10, and are secured by bolts, thereby providing an axial connection at the ski.

Both the axle lugs 18, and the bracket 21, are heat treated and then the various apertures therein reamed to a predetermined size.

The foregoing description includes the yoke A and members to secure the said yoke to the wheel element and to the ski element.

In addition a cable 22 is secured to the minor flange 20, and to a ski fitting 23, positioned substantially plumb with the said flange 20. The said cable lies snug when the aircraft is on the ground without a load. Blocks 24, having a bevelled surface abutting the wheel, are positioned on both the front and rear thereof and secured to the ski by flatheaded wood screws.

The usual check cables 25 are provided fore and aft of the skis to control the trim of the said skis.

In the drawings Figs. 8 to 13, inclusive, show the tail ski assembly. It will be seen the general features of the landing ski assembly are adapted to the tail ski. Where these features show similar use and design similar reference characters have been used to designate these, and the landing ski assembly features. New features, as described, will be given new reference characters.

The tubular member 10 is secured directly to the axle of the tail wheel thus doing away with the lug used on the landing wheels. To provide means to secure the cable 22, a flange 26 extends from the member 10. A further modification is the angular alignment of the tubes 10, as shown in Fig. 9 and Fig. 11.

The ski fitting 27, to receive the yoke consists of a plurality of braces 28, which strengthen and support the annular housing 29. The axial connection resides in a single bar 30, which extends through each ski fitting 27. Check cables 25 are provided fore and aft of the tail ski.

It is believed that the construction and advantages of the invention shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. A ski landing mechanism for aircraft comprising a yoke adapted to straddle a wheel of an aircraft undercarriage and pivotally connected at one end to the axle of the wheel, said yoke extending forwardly and downwardly with its opposite end pivotally connected to the fore part of a ski, and a flexible element having one end connected to the wheel axle and its opposite end connected to the ski, said flexible element being substantially vertical when in normal position.

2. A ski landing mechanism for aircraft comprising a yoke adapted to straddle a wheel of an aircraft undercarriage and pivotally connected at one end to the axle of the wheel, said yoke extending forwardly and downwardly with its opposite end pivotally connected to the fore part of a ski, a plate bridging the lower end of said yoke and mounted thereon having its inner edge curved to conform to the curvature of the tire of the wheel, and a flexible element having one end connected to the wheel axle and its opposite end connected to the ski, said flexible element being substantially vertical when in normal position.

3. In a ski landing mechanism, the combination with the wheel, tire and axle of an aircraft undercarriage, of a ski runner, a pair of lugs attached to the axle on opposite sides of the wheel having flanges depending therefrom, a pair of parallel members pivotally attached at one end to one flange of said lugs and extending forwardly and downwardly with their opposite ends pivotally attached to the fore part of said runner, a plate bridging said members and mounted thereon with its inner edge engaging the periphery of the tire of the wheel, and a flexible element connected at one end to the other flange of said lugs and having its opposite end connected to said runner, said flexible element being substantially plumb when in normal position.

4. In a ski landing mechanism, the combination with the wheel, tire and axle of an aircraft undercarriage, of a ski runner, detachable lugs secured to the axle on opposite sides of the wheel having flanges depending therefrom, parallel members pivotally attached at one end to one of the flanges of said lugs and extending forwardly and downwardly with their opposite ends pivotally attached to the fore part of said ski runner, a plate bridging said members at their lower ends and mounted thereon with its inner edge curved to conform to the curvature of the tire of the wheel, and a flexible cable attached at one end to the other flange of said lugs and having its opposite end secured to the top of said ski runner, said cable being substantially plumb when in normal position.

WILFRED LEIGH BRINTNELL.